(12) United States Patent  (10) Patent No.: US 6,612,338 B2
Weldon et al.  (45) Date of Patent: Sep. 2, 2003

(54) FUEL TANK PRESSURE CONTROL VALVE

(75) Inventors: Craig Andrew Weldon, Chatham (CA); John Edward Cook, Chatham (CA); William Charles Gillier, Chatham (CA)

(73) Assignee: Siemens Automotive Inc. (CA)

( * ) Notice: Subject to any disclaimer, the term of this patent is extended or adjusted under 35 U.S.C. 154(b) by 0 days.

(21) Appl. No.: 09/863,756

(22) Filed: May 24, 2001

(65) Prior Publication Data

US 2002/0185181 A1 Dec. 12, 2002

Related U.S. Application Data

(60) Provisional application No. 60/206,964, filed on May 25, 2000.

(51) Int. Cl.[7] .......................... F16K 11/16; F16K 31/06
(52) U.S. Cl. .................. 137/630.19; 137/529; 137/629; 137/589
(58) Field of Search ................... 137/529, 628, 137/629, 630.19, 587, 589; 141/59; 123/518, 519, 520; 220/86.2; 251/129.01, 129.15

(56) References Cited

U.S. PATENT DOCUMENTS

| 3,797,526 | A | * | 3/1974 | Champeon | 137/630.14 |
|---|---|---|---|---|---|
| 4,266,574 | A | * | 5/1981 | Tilling | 137/630.19 |
| 4,483,369 | A | | 11/1984 | Akagi et al. | 137/625.12 |
| 4,679,580 | A | * | 7/1987 | Devall et al. | 137/39 |
| 4,703,737 | A | * | 11/1987 | Cook et al. | 123/520 |
| 4,782,862 | A | * | 11/1988 | Nguyen | 137/630.14 |
| 5,054,528 | A | * | 10/1991 | Saitoh | 141/59 |
| 5,083,546 | A | * | 1/1992 | Detweiler et al. | 123/520 |
| 5,099,880 | A | * | 3/1992 | Szlaga et al. | 137/587 |
| 5,301,714 | A | * | 4/1994 | Johnson | 137/599.16 |
| 5,390,703 | A | | 2/1995 | Tengesdal | 137/629 |
| 5,535,725 | A | * | 7/1996 | Baker et al. | 123/520 |
| 5,629,660 | A | | 5/1997 | Kenyon et al. | 335/227 |
| 6,021,997 | A | | 2/2000 | Hell | 251/30.04 |
| 6,227,176 | B1 | * | 5/2001 | Hettmann | 123/516 |
| 6,499,472 | B2 | | 12/2002 | Weldon et al. | 123/520 |
| 2002/0078932 | A1 | | 6/2002 | Weldon et al. | |
| 2002/0088440 | A1 | | 7/2002 | Weldon et al. | |
| 2002/0088441 | A1 | | 7/2002 | Weldon et al. | |
| 2002/0088492 | A1 | | 7/2002 | Weldon et al. | |
| 2002/0088494 | A1 | | 7/2002 | Weldon et al. | |
| 2002/0088957 | A1 | | 7/2002 | Weldon et al. | |
| 2002/0088958 | A1 | | 7/2002 | Weldon et al. | |

OTHER PUBLICATIONS

PCT International Search Report; PCT CA01/00771; Dec. 17, 2001.

* cited by examiner

Primary Examiner—Michael Powell Buiz
Assistant Examiner—Ramesh Krishnamurthy

(57) ABSTRACT

A valve structure that comprises a housing and a valve. The housing includes a first fluid communication passage between a first port and a second port. The valve is movable with respect to the housing between a first configuration, a second configuration, and an intermediate configuration between the first and second configurations. The first configuration permits substantially unrestricted fluid flow between the first and second ports. The second configuration substantially prevents fluid flow between the first and second ports. And the intermediate configuration provides restricted fluid flow between the first and second ports. The valve includes a first valve element and a second valve element. The first valve element includes a second fluid communication passage providing the restricted fluid flow between the first and second ports. The second valve element is positionable in first and second positions with respect to the first valve element. The first position of the second valve element substantially permits the restricted fluid flow through the second fluid communication passage. And the second location of the second valve substantially prevents the restricted fluid flow through the second fluid communication passage.

15 Claims, 3 Drawing Sheets

FUEL TANK PRESSURE CONTROL VALVE

CLAIM FOR PRIORITY

This application claims the benefit of priority of U.S. provisional patent application, application serial No. 60/206,964, filed May 25, 2000, which is incorporated herein in its entirety by reference.

FIELD OF THE INVENTION

This disclosure generally relates to a pressure control valve. In particular, this disclosure is directed to an electrically operated valve to control the level of vapor pressure in a fuel tank of a vehicle.

BACKGROUND OF THE INVENTION

It is believed that prior to legislation requiring vehicles to store hydrocarbon vapors that are generated when refueling a vehicle, a simple orifice structure was used to maintain a positive pressure in a fuel tank to retard vapor generation. It is believed that such orifice structures could no longer be used with the advent of requirements controlling on-board refueling. It is believed that, on some vehicles, the orifice structure was simply deleted, and on other vehicles, the orifice structure was replaced with a diaphragm-actuated pressure relief valve. It is believed that these diaphragm-actuated valves suffer from a number of disadvantages including that the calibration (i.e., pressure blow-off level) changes with temperature and age.

It is believed that it is necessary on some vehicles to maintain an elevated pressure in the fuel tank to suppress the rate of fuel vapor generation and to minimize hydrocarbon emissions to the atmosphere. It is believed that under hot ambient temperature conditions or when the fuel is agitated, e.g., when a vehicle is operated on a bumpy road, the amount of fuel vapor generated can exceed the amount of fuel vapor that can be purged by the engine. It is believed that a purge canister can become hydrocarbon saturated if these conditions occur and are maintained for an extended period. It is believed that such a hydrocarbon saturated purge canister is unable to absorb the additional fuel vapors that occur during vehicle refueling, and that hydrocarbon vapors are released into the atmosphere.

It is believed that there is a need to provide a valve that overcomes the drawbacks of orifice structures and diaphragm-actuated pressure relief valves.

SUMMARY OF THE INVENTION

The present invention provides a valve structure that comprises a housing and a valve. The housing includes a first fluid communication passage between a first port and a second port. The valve is movable with respect to the housing between a first configuration, a second configuration, and an intermediate or third configuration between the first and second configurations. The first configuration permits substantially unrestricted fluid flow between the first and second ports. The second configuration substantially prevents fluid flow between the first and second ports. And the intermediate configuration provides restricted fluid flow between the first and second ports. The valve includes a first valve element and a second valve element. The first valve element includes a second fluid communication passage providing the restricted fluid flow between the first and second ports. The second valve element is positional between first and second locations with respect to the first valve element. The first location of the second valve element substantially permits the restricted fluid flow through the second fluid communication passage. And the second location of the second valve substantially prevents the restricted fluid flow through the second fluid communication passage.

The present invention also provides a valve for controlling fuel vapor pressure in a fuel tank. The valve comprises a housing, an electromagnetic actuator, a first body, a second body, a first resilient element, and a second resilient element. The housing includes an inlet port and an outlet port. The electromagnetic actuator includes a stator and an armature. The stator is fixed with respect to the housing, and the armature is displaceable along an axis with respect to the stator. The first body is fixed to the armature and is displaceable along the axis with respect to the housing. The first body includes a conduit, a projection, an end cap, and at least one radial aperture. The conduit extends along the axis between first and second ends. The conduit has an interior volume in fluid communication with the inlet port via the first end. The projection extends radially outward from the first end. The end cap occludes the second end and projects radially outward from the conduit. The at least one radial aperture penetrates the conduit and is located proximate the second end relative to the first end. The second body is displaceable along the axis with respect to the housing and is telescopically disposed with respect to the first body. The second body includes a tube and a flange. The tube is displaceable with respect to the conduit between the end cap and the projection. The flange extends radially outward from the tube and is located proximate the first end of the conduit relative to the second end of the conduit. The first resilient element extends between the end cap and the flange and biases the second body toward the first end of the conduit. The second resilient element extends between the first body and the housing and opposes an actuating force of the electromagnetic actuator. There are a plurality of configurations of the first and second bodies with respect to the housing including a first configuration, a second configuration, and a third configuration. The first configuration permits substantially unrestricted fuel vapor flow from the inlet port to the outlet port. In the first configuration, the flange is spaced from the housing such that fluid communication is permitted between the inlet and outlet ports via a gap between the flange and the housing, and the second body is positioned toward the first end of the conduit such that fluid communication is permitted between the inlet and outlet ports via a combination of the first end of the conduit, the interior volume of the conduit, and the at least one aperture penetrating the conduit. The second configuration substantially prevents fuel vapor flow from the inlet port to the outlet port. In the second configuration, the flange engages the housing such that the gap is closed, and the second body is positioned away from the second end of the conduit such that the tube occludes the at least one aperture. The third configuration provides restricted fuel vapor flow from the inlet port to the outlet port. In the third configuration, the flange engages the housing such that the gap is closed, and the second body is displaced toward the first end of the conduit such that fluid communication is permitted between the inlet and outlet ports via that combination of the first end of the conduit, the interior volume of the conduit, and the at least one aperture penetrating the conduit.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
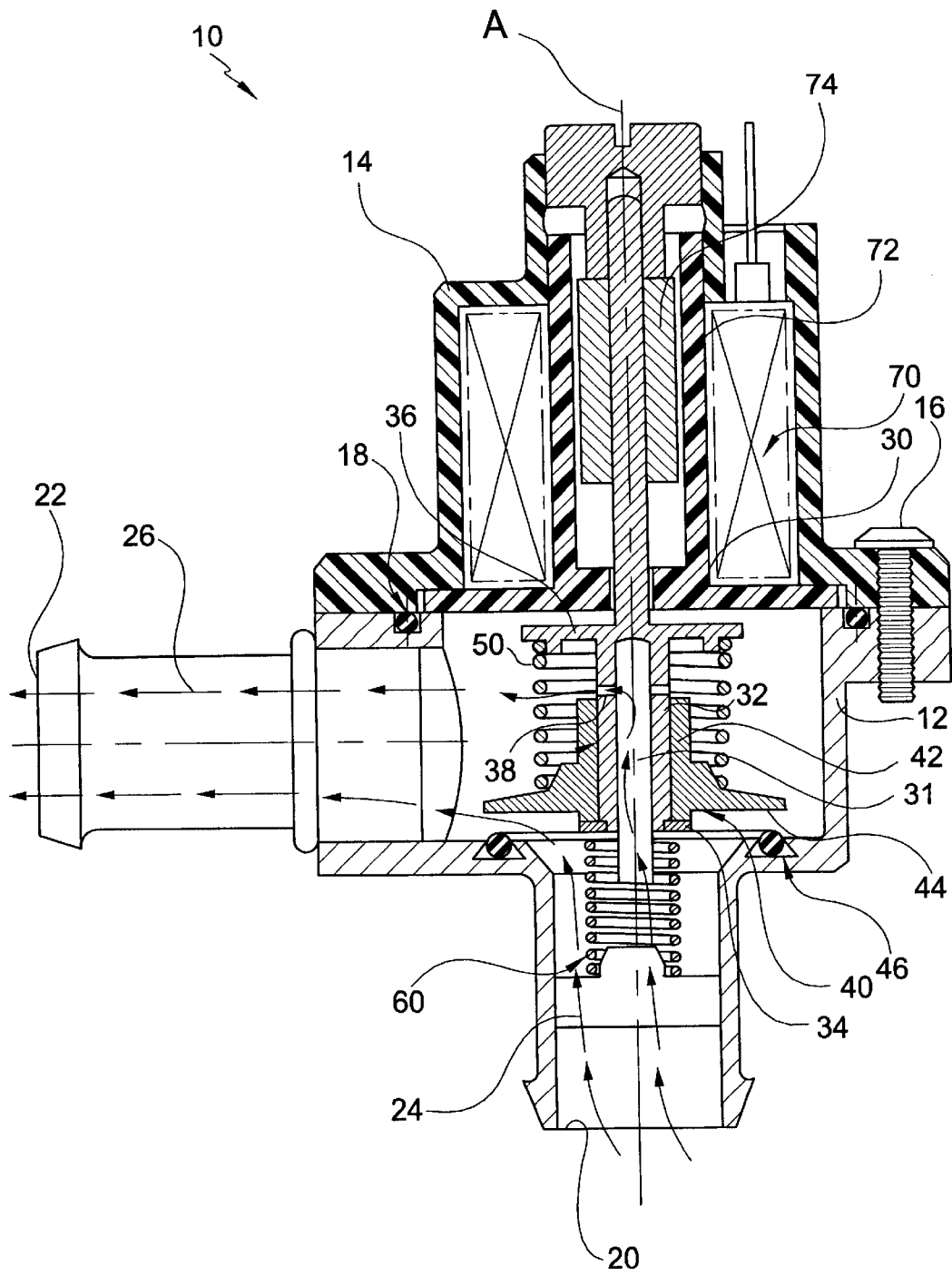
FIG. 1 is a sectional view of a first configuration of a fuel tank pressure control valve wherein fuel vapor flow is permitted through a first fluid communication passage and is permitted through a second fluid communication passage.
Figure 2:
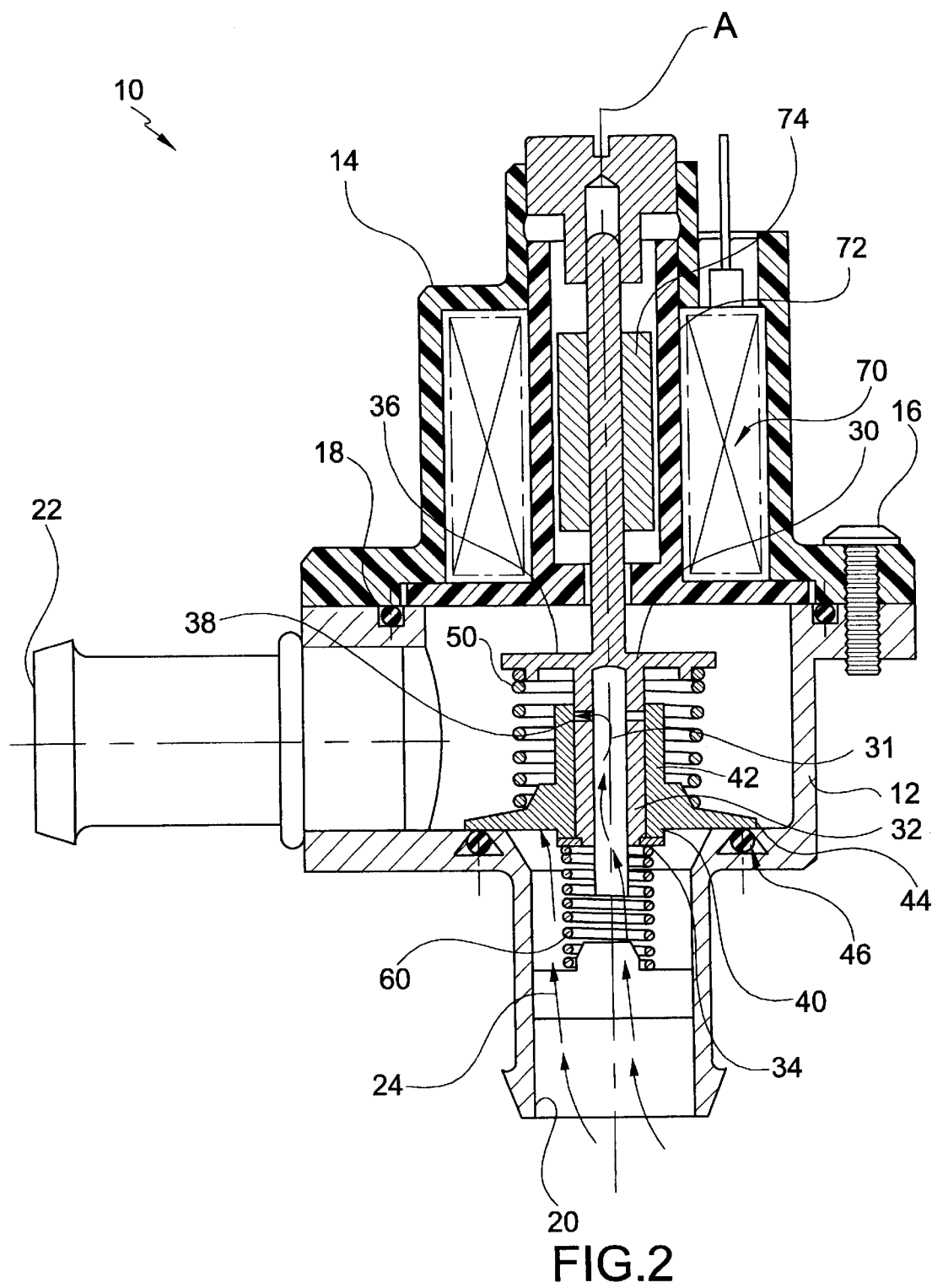
FIG. 2 is a sectional view of a second configuration of the fuel tank pressure control valve wherein fuel vapor flow is prevented through the first fluid communication passage and is prevented through the second fluid communication passage.
Figure 3:
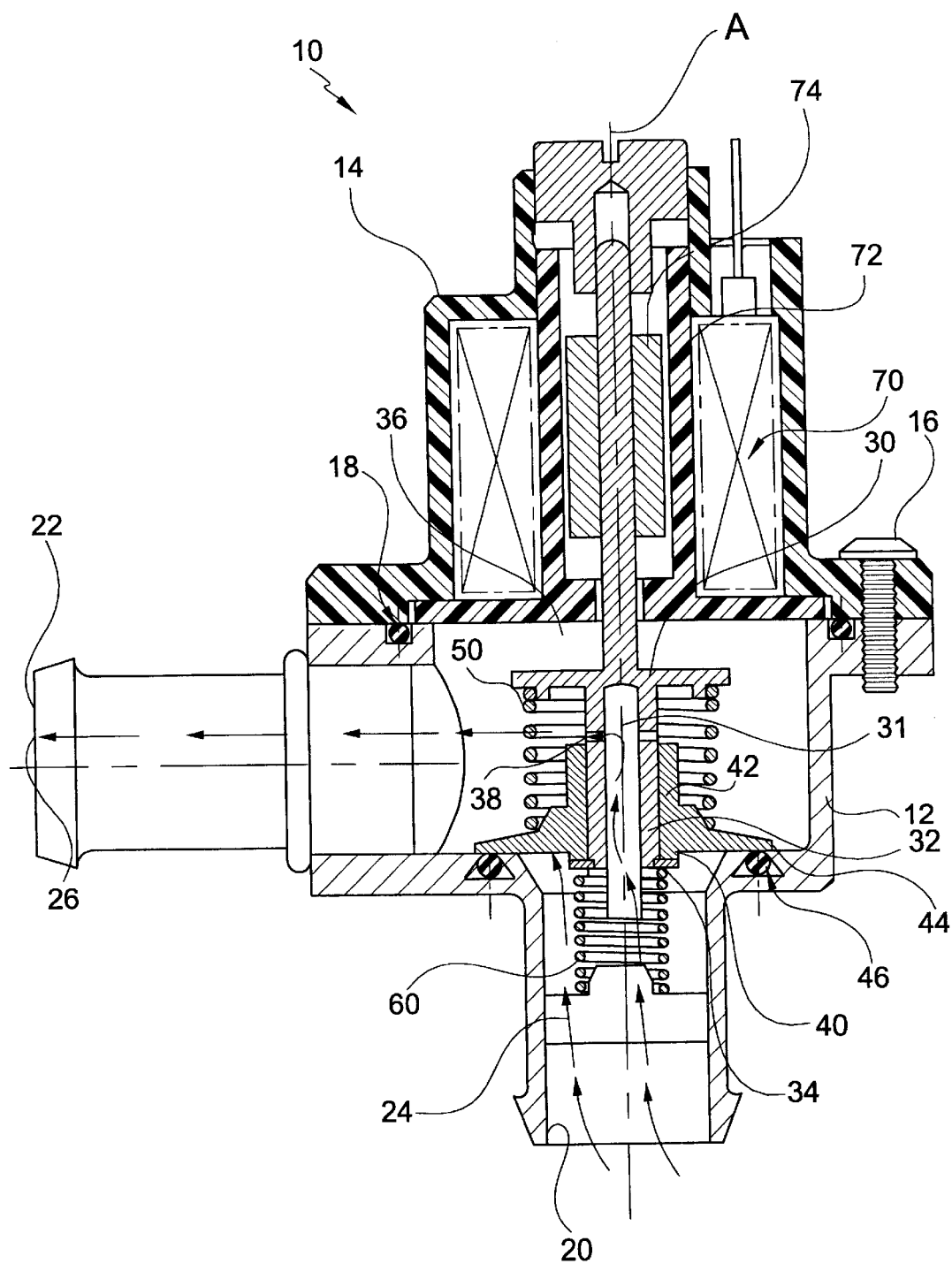
FIG. 3 is a sectional view a third configuration of the fuel tank pressure control valve wherein fuel vapor flow is prevented through the first fluid communication passage and is permitted through the second fluid communication passage.

FIGS. 1–3 show various configurations of a valve 10 that controls a level of vapor pressure in a vehicle fuel tank (not shown). The fuel tank pressure control valve 10 can be located along a vapor line (not shown) connecting a fuel vapor dome, i.e., the gaseous portion within a fuel tank (not shown), and a charcoal canister (not shown). A canister purge control valve (not shown) can be used to purge hydrocarbons that have been collected in the charcoal canister (not shown). Typically, the hydrocarbons that are purged from the charcoal canister are combusted by an internal combustion engine (not shown).

A vapor dome pressure level that is approximately 10" water above atmospheric pressure initially has been determined to suppress fuel vapor generation in the fuel tank (not shown). A fuel tank pressure sensor (not shown) can be used to detect pressures in excess of this determined level. When excess pressure is detected, the fuel tank pressure control valve 10 is supplied an electrical signal which results in the fuel tank pressure control valve 10 opening to decrease pressure to or slightly below the determined level.

The fuel tank pressure control valve 10 comprises a housing that can be composed of a first housing portion 12 and a second housing portion 14. The first housing portion 12 can be made of metal or any other material that is suitable for contacting and containing fuel and/or fuel vapor, and the second housing portion 14 can be made of plastic or any other material that is suitable for housing an electromagnetic actuator. However, the first housing portion 12 and the second housing portion 14 could be the same material as long as the common material is suitable for the intended purpose of each housing portion. The first and second housing portions 12,14 can be fastened together, for example, by machine screws 16. Alternative fasteners, such as rivets, bolts, etc., and fastening techniques, e.g., with adhesives, can be substituted for the machine screws 16. A rubber O-ring 18 provides a fluid tight seal between the first and second housing portions 12,14. Alternative sealing means, e.g., a gasket, can be substituted for the O-ring 18.

The first housing portion 10 includes an inlet port 20 for ingress of fuel vapor and an outlet port 22 for egress of fuel vapor. Fluid communication between the inlet port 20 and the outlet port 22 is via at least one of a first fluid communication passage 24 and a second fluid communication passage 26. Fuel vapor flow through the fluid communication passages 24,26 is controlled by valve elements 30 and 40.

The first valve element 30 comprises a tubular conduit 32, a projection 34, an end cap 36, and at least one radial aperture 38 (two are shown). The first valve element 30 defines an interior volume 31 in fluid communication with the inlet port 20. The projection 34 extends radially outward from an axis A. The end cap 36 occludes an end of the conduit 32 and projects radially outward from the axis A. The at least one radial aperture 38 penetrates the conduit 32 and is located proximate the end cap 36. The first valve element 30 is displaceable along the axis A.

The second valve element 40 is displaceable along the axis A with respect to the housing 10,20 and is telescopically disposed with respect to the first valve element 30. The second valve element 40 includes a tube 42 and a flange 44. The tube 42 is displaceable with respect to the conduit 32 between the end cap 36 and the projection 34. The flange 44 extends radially outward from the tube 42.

A seal 46 can be placed at the interface between the flange 44 and the first housing portion 12. The seal 46 is shown as a rubber O-ring but maybe made out of any suitable material and may be made in any suitable form.

A first resilient element 50, e.g., a coil spring centered around the axis A, extends between the end cap 36 and the flange 44 and biases the second valve element 40 away from the end cap 36. The projection 34 of the first valve element 30, which is preferably, a snap ring, prevents disengagement of the second valve element 40 from the first valve element 30.

A second resilient element 60 extends between the first valve element 30 and the housing 12, and opposes an actuating force of an electromagnetic actuator 70.

The electromagnetic actuator 70 includes a stator 72 and an armature 74. The stator 72 is fixed with respect to the second housing portion 14, and the armature 74 is displaceable along the axis A with respect to the stator 72. The stator has two portions, an upper portion disposed within the housing 12 and a lower portion partially disposed between the housing portions 12 and 14. The lower portion supports a bearing that guides a shaft which connects the armature 74 and the first valve element 30.

There are a plurality of configurations of the first and second valve elements with respect to the housing 12,14. Referring to FIG. 1, a first configuration permits substantially unrestricted fuel vapor flow from the inlet port 20 to the outlet port 22. In the first configuration, the flange 44 is spaced from the first housing portion 12 such that fluid communication is permitted via the first fluid communication passage 24 via a gap between the flange 44 and the first housing portion 12, and the second valve element 40 is positioned away from the projection 34 such that fluid communication is permitted via the second fluid communication passage 26, i.e., via the interior volume of the conduit and the at least one aperture 38 penetrating the conduit 32.

Referring to FIG. 2, a second configuration substantially prevents fuel vapor flow from the inlet port 20 to the outlet port 22. In the second configuration, the flange 44 engages the first housing portion 12 such that the gap of the first fluid communication passage 24 is closed, and the second valve element 40 is positioned with respect to the first valve element 30 such that the tube 42 occludes the at least one aperture 38 to close the second communication passage 26. To achieve this position the first valve element 30 is displaced by the electromagnetic actuator 70 along axis A toward the second valve element 40, and the first valve element 30 is moved relative to the second valve element 40.

In a second configuration if tank pressure becomes too large, e.g. via burst pressure from a collision, the first and second valve elements permit a release flow of fuel vapor from the inlet port to the outlet port. The release of pressure provides a safety blow-off feature. This is achieved because the pressure acting on the flange 44 is greater than the force of the electromagnetic actuator 70. When this occurs, the flange 44 is spaced from the first housing portion 12 such that fluid communication is permitted via the gap, and the second valve element 40 is displaced toward the end cap 36 such that the tube 42 can occlude the at least one aperture 38.

Referring to FIG. 3, a third configuration provides restricted fuel vapor flow from the inlet port 20 to the outlet port 22. In the third configuration, the flange 44 engages the first housing portion 12 such that the gap is closed, and the second valve element 40 is positioned away from the projection 34 such that fluid communication is permitted via second fluid communication passage 26, i.e., via the interior volume of the conduit and the at least one aperture 38 penetrating the conduit 32. The third configuration occurs at an intermediate position between the first and second configurations.

The electromagnetic actuator 70, e.g., a solenoid, operates via a power device, which can be a constant current driver or a pulse-width-modulated signal, such that there is an approximately zero power level when the valve 10 is in the first configuration, there is an approximately fifty percent duty level when the valve 10 is in the third configuration, and there is an approximately one-hundred percent power level when the valve 10 is in the second configuration. Thus, when the electromagnetic actuator 70 is not energized, both the first and second fluid communication passages 24,26 are open. This also provides a fail-safe condition such that fuel vapor build-up is prevented in the fuel tank.

This fuel tank pressure control valve 10 provides low flow restriction during fuel tank re-fueling (i.e., in the first configuration), fails to an open state (i.e., the first configuration), and provides restricted flow during routine vehicle operation to ensure that a sufficient vapor pressure is maintained to suppress additional fuel vapor generation (i.e., the third configuration).

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A valve structure comprising:
    a housing including a first fluid communication passage between a first port and a second port;
    a valve movable with respect to the housing between a first configuration, a second configuration, and a third configuration between the first and second configurations, the first configuration permitting substantially unrestricted fluid flow between the first and second ports, the second configuration substantially preventing fluid flow between the first and second ports, and the third configuration providing restricted fluid flow between the first and second ports, the valve including:
        a first valve element including a second fluid communication passage providing the restricted fluid flow between the first and second ports, and
        a second valve element positionable between first and second locations with respect to the first valve element, the first location of the second valve element substantially permitting the restricted fluid flow through the second fluid communication passage including at least one radial aperture penetrating the first valve element, and the second location of the second valve element occluding the at least one radial aperture and substantially preventing the restricted fluid flow through the second fluid communication passage; and
    a first resilient element biasing the valve toward the first configuration.

2. The valve structure according to claim 1, further comprising:
    an actuator displacing the first valve element against the bias of the first resilient element.

3. The valve structure according to claim 2, wherein the actuator comprises an electromagnetic solenoid.

4. A valve structure comprising:
    a housing including a first fluid communication passage between a first port and a second port;
    a valve movable with respect to the housing between a first configuration, a second configuration, and an intermediate configuration between the first and second configurations, the first configuration permitting substantially unrestricted fluid flow between the first and second ports, the second configuration substantially preventing fluid flow between the first and second ports, and the intermediate configuration providing restricted fluid flow between the first and second ports, the valve including:
        a first valve element including a second fluid communication passage providing the restricted fluid flow between the first and second ports; and
        a second valve element positionable between first and second locations with respect to the first valve element, the first location of the second valve element substantially permitting the restricted fluid flow through the second fluid communication passage, and the second location of the second valve element substantially preventing the restricted fluid flow through the second fluid communication passage;
    a first resilient member biasing the valve toward the first configuration; and
    an actuator displacing the first valve element against the bias of the first resilient member, the actuator including an electromagnetic solenoid that operates via a power device such that there is an approximately zero percent power level when the valve is in the first configuration, there is an approximately fifty percent power level when the valve is in the intermediate configuration, and there is an approximately one-hundred percent power level when the valve is in the second configuration.

5. A valve structure comprising:
    a housing including a first fluid communication passage between a first port and a second port;
    a valve movable with respect to the housing between a first configuration, a second configuration, and an intermediate configuration between the first and second configurations, the first configuration permitting substantially unrestricted fluid flow between the first and second ports, the second configuration substantially preventing fluid flow between the first and second ports, and the intermediate configuration providing restricted fluid flow between the first and second ports, the valve including:
        a first valve element including a second fluid communication passage providing the restricted fluid flow between the first and second ports; and a second valve element positionable between first and second locations with respect to the first valve element, the first location of the second valve element substantially permitting the restricted fluid flow through the second fluid communication passage, and the second location of the second valve element substantially preventing the restricted fluid flow through the second fluid communication passage;

a first resilient member biasing the valve toward the first configuration; and a second resilient element biasing the second valve element toward the first second valve element location with respect to the first valve element.

6. The valve structure according to claim 5, wherein the first and second resilient elements comprise coil springs having coincidental central axes.

7. A valve structure comprising:

a housing including a first fluid communication passage between a first port and a second port; and a valve movable with respect to the housing between a first configuration, a second configuration, and an intermediate configuration between the first and second configurations, the first configuration permitting substantially unrestricted fluid flow between the first and second ports, the second configuration substantially preventing fluid flow between the first and second ports, and the intermediate configuration providing restricted fluid flow between the first and second ports, the valve including:

a first valve element positionable between first and second locations with respect to a second valve element, the first location of the first valve element substantially permitting the restricted fluid flow between the first and second ports through a second fluid communication passage, and the second location of the first valve element substantially preventing the restricted fluid flow through the second fluid communication passage; and a second valve element including the second fluid communication passage, the second valve element including first and second radial projections, the first radial projection supporting the first valve element in the first location, and the second radial projection constraining displacement of the first valve element from the first location toward the second location.

8. The valve structure according to claim 7, wherein the first radial projection comprises a snap ring.

9. The valve structure according to claim 7, wherein the second valve element comprises a first tube extending along the axis between the first and second radial projections, and the first valve element comprises a second tube and a flange, the second tube telescopically surrounding the first tube.

10. The valve structure according to claim 9, further comprising:

a seal at an interface of the housing and the flange of the first valve element.

11. The valve structure according to claim 7, wherein the second fluid communication passage comprises at least one orifice penetrating the second valve element and providing the restricted fluid flow between the first and second ports.

12. A valve for controlling fuel vapor pressure in a fuel tank, the valve comprising:

a housing including an inlet port and an outlet port;

an electromagnetic actuator including a stator and an armature, the stator being fixed with respect to the housing, and the armature being displacable along an axis with respect to the stator;

a first body being fixed to the armature and being displacable along the axis with respect to the housing, the first body including:

a conduit extending along the axis between first and second ends, the conduit having an interior volume in fluid communication with the inlet port via the first end, a projection extending radially outward from the first end, an end cap occluding the second end and projecting radially outward from the conduit, and at least one radial aperture penetrating the conduit the at least one radial aperture being located proximate the second end relative to the first end;

a second body being displacable along the axis with respect to the housing and being telescopically disposed with respect to the first body, the second body including:

a tube being displacable with respect to the conduit between the end cap and the projection, and a flange extending radially outward from the tube, the flange being located proximate the first end of the conduit relative to the second end of the conduit;

a first resilient element extending between the end cap and the flange, the first resilient element biasing the second body toward the first end of the conduit; and a second resilient element extending between the first body and the housing, the second resilient element opposing an actuating force of the electromagnetic actuator;

whereby there are a plurality of configurations of the first and second bodies with respect to the housing, the plurality of configurations including:

a first configuration permitting substantially unrestricted fuel vapor flow from the inlet port to the outlet port, the first configuration including the flange being spaced from the housing such that fluid communication is permitted between the inlet and outlet ports via a gap between the flange and the housing, and including the second body being the displaced toward the first end of the conduit such that fluid communication is permitted between the inlet and outlet ports via a combination of the first end of the conduit, the interior volume of the conduit, and the at least one aperture penetrating the conduit;

a second configuration substantially preventing fuel vapor flow from the inlet port to the outlet port, the second configuration including the flange engaging the housing such that the gap is closed, and including the second body being positioned toward the second end of the conduit such that the tube occludes the at least one aperture; and a third configuration providing restricted fuel vapor flow from the inlet port to the outlet port, the third configuration including the flange engaging the housing such that the gap is closed, and including the second body being positioned away from the first end of the conduit such that fluid communication is permitted between the inlet and outlet ports via that combination of the first end of the conduit, the interior volume of the conduit, and the at least one aperture penetrating the conduit.

13. The valve according to claim 12, further comprising:

a seal at an interface of the flange and the housing.

14. The valve according to claim 12, wherein the first resilient element comprises a first coil spring centered around the axis, the second resilient element comprises a second coil spring centered around the axis, and the first coil spring has a greater spring rate relative to the second coil spring.

15. The valve according to claim 12, wherein the electromagnetic actuator operates via a power device electric signal such that there is an approximately zero percent power level when the first and second bodies are in the first configuration, there is an approximately fifty percent power level when the first and second bodies are in the third configuration, and there is an approximately one-hundred percent power level when the first and second bodies are in the second configuration.

* * * * *